Oct. 10, 1950   E. M. BROOKS ET AL   2,525,337
NONCRUSHABLE LUNCH-BOX PIE CONTAINER
Filed June 9, 1948

EDRA MAE BROOKS,
VICTORIA A. JEFFRIES,
INVENTORS.

BY

ATTORNEY.

Patented Oct. 10, 1950

2,525,337

UNITED STATES PATENT OFFICE 2,525,337

NONCRUSHABLE LUNCH-BOX PIE CONTAINER

Edra Mae Brooks and Victoria A. Jeffries, Los Angeles, Calif.

Application June 9, 1948, Serial No. 31,906

1 Claim. (Cl. 206—4)

Generally speaking, this invention relates to an improved food container intended for use in a lunch kit. More particularly, it relates to a relatively rigid container of virtually sector shape in plan view and adapted to contain one or more sector-shaped cuts of cake or pie and to protect same from being crushed by other objects within a lunch kit by reason of the rigidity of the container and to also form a sealed enclosure around the cake or pie cuts contained therein, thus preventing the escape of any of the contents, such as, for example, in the case of berry pie juice.

Lunch and picnic boxes of various types are quite commonly used for carrying lunches, snacks, cold meals, and the like. Usually, a lunch will contain sandwiches, fruit, a hot or cold drink and a dessert of some type, which often is a cut of pie or cake. No provision is made in prior art lunch boxes for protecting a cut of pie or cake and it is usually protected only by wrapping in a piece of waxed or oiled paper, or the like, prior to placing same in the lunch box. This type of protection is of some effectiveness in that it generally prevents the escape of liquid from a pie cut, for example. However, it is undesirable in that the pie cut or cake cut will oftentimes adhere to the waxed or oiled paper, and considerable difficulty in removing the pie or cake cut from the waxed paper will be encountered. This is particularly true of juicy pies and of the frosting on cakes. However, the main disadvantage of such relatively flimsy protection is that the cake or pie cut may be crushed by reason of other objects in the lunch box resting upon or coming into contact therewith.

The person packing such a lunch box usually tries to minimize the probability of this occurring by placing the pie or cake cut on the top of the rest of the objects within the lunch box. However, this is a rather ineffective method of protecting the fragile cake and pie cuts, since it is predicated upon the assumption that the lunch kit will remain in a horizontal position at all times and that no acceleration, negative or positive, or up-ending movement thereof will occur. Quite frequently, such is not the case, and when the carrier of the lunch box opens same to remove the lunch, he finds the cake and pie cuts in a crushed and quite unappetizing condition.

Generally speaking, the apparatus of the present invention comprises a hollow food container of virtually sector shape in plan view and of a size such as to comfortably encompass the usual size sector-shaped cake or pie cut. The container is of relatively rigid, self-sustaining construction and preferably is sealed when closed so as to prevent the escape of the contents thereof. In a slightly modified arrangement, a sector-shaped tray is arranged to be positioned within the hollow container and spaced from the bottom thereof, whereby two sector-shaped cuts of cake or pie may be carried within the container.

It can be seen from the above general description that the present invention completely solves the hereinabove-mentioned problems, since a cake or pie cut, or in the modified form, two cuts, may be effectively protected from crushing and also sealed so as to prevent any juice escaping into the lunch box. Furthermore, there is no tendency for the cake or pie cuts to adhere to the container in the hereinabove-mentioned manner.

With the above points in mind, it is an object of the present invention to provide a relatively rigid hollow food container arranged for use within a lunch box and of a shape such as to conveniently encompass a cake or pie cut and protect same from being crushed.

It is a further object of the present invention to provide a relatively rigid hollow food container arranged for use within a lunch box and of a shape such as to conveniently encompass a cake or pie cut and protect same from being crushed by other objects within a lunch kit and arranged to form a sealed closure around the cake or pie cut for preventing the escape of liquid from within the container into the rest of the lunch box.

It is a further object of the present invention to provide a relatively rigid hollow food container provided with a tray spaced from the bottom thereof and so arranged that two sector-shaped bakery food cuts may simultaneously be carried within the container and protected from being crushed.

It is a further object of the present invention to provide a relatively rigid hollow food container provided with a tray spaced from the bottom thereof and so arranged that two sector-shaped bakery food cuts may simultaneously be carried within the container and protected from being crushed by other objects within a lunch box and arranged to form a sealed closure around the cake or pie cut for preventing the escape of liquid from within the container into the rest of the lunch box.

Other and allied objects will become apparent to those skilled in the art upon a careful examination, study and perusal of the specification, illustrations and appended claim. To facilitate understanding, reference will be had to the following drawings, in which:

Figure 1:
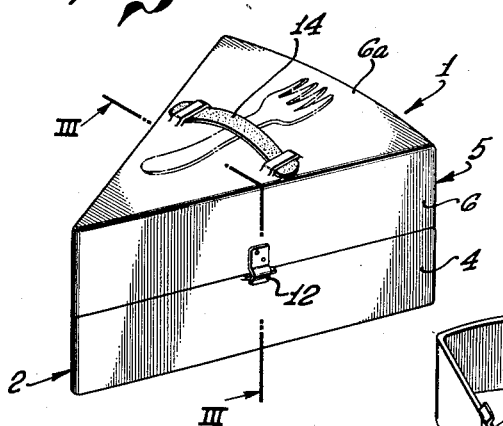
Fig. 1 is a perspective view of one illustrative embodiment of the present invention.
Figure 2:
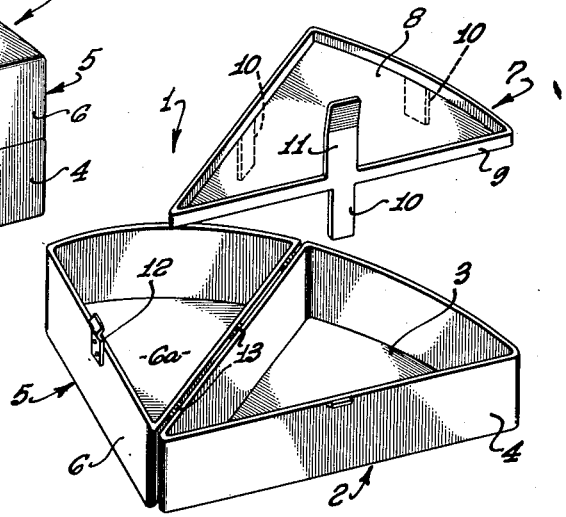
Fig. 2 is an exploded perspective view of the embodiment illustrated in Fig. 1 with the container open.
Figure 3:
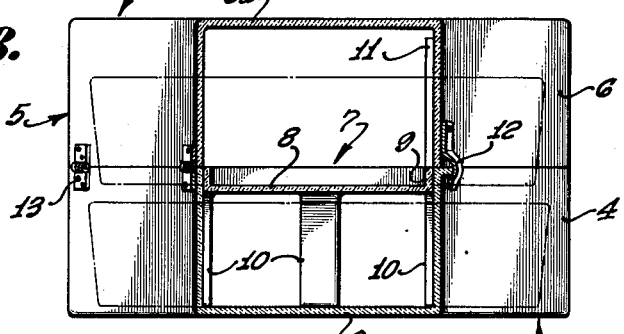
Fig. 3 is a sectional elevational view taken in the direction of the arrows III—III shown in Fig. 1.

More specifically, referring to the first illustrative embodiment of my invention shown in Figs. 1, 2 and 3, a rigid, virtually sector-shaped, hollow container is indicated generally at 1 and includes a relatively rigid hollow container body member 2 which is of sector shape in plan view and which includes a sector-shaped bottom wall 3 and an upstanding edge wall 4, which in the example illustrated is continuous and integral with the bottom 3.

Also forming a part of the container 1 is a top closure member 5 arranged to cooperate with the hollow bottom member 2. In the example illustrated, the top closure member 5 is provided with a downwardly directed edge wall 6, which is continuous and integral with a transverse top wall 6a of the closure member 5. It should be noted that the closure member 5 is also of sector shape in plan form.

In the first embodiment of the present invention illustrated in Figs. 1, 2 and 3, a removable insert tray 7 is provided and comprises a base 8, an upstanding edge wall 9 continuous and integral with the base 8 and downwardly directed supporting feet 10 arranged to contact the upper side of the bottom wall 3 of the body member 2 in order to maintain the insert tray 7 in a position spaced above and virtually parallel to the bottom wall 3, whereby a sector-shaped cut of cake or pie may be positioned on the bottom wall 3 of the body member 2 below the insert tray 7 and a second sector-shaped cut of cake or pie may be carried by the tray 7.

In the example illustrated, a manually accessible removing handle 11 is connected to the tray 7 for facilitating removal of the tray from the container and for insertion of the tray into the container. In the example illustrated, closure member 5 is provided with a releasable fastening means 12 adapted to fasten the closure member 5 with respect to the body member 2 when desired, and may be of any suitable type. Also shown in the example illustrated is hinge means 13 connecting the closure member 5 and the body member 2. A rigid strap 14 is shown carried by the closure member 6 in the example illustrated and is adapted to frictionally retain knife, fork or spoon, if desired.

Figure 4:
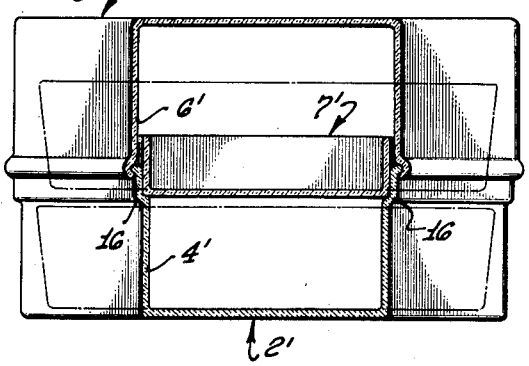
Fig. 4 is a sectional elevational view of a slightly modified form of the present invention viewed from the same aspect as Fig. 3.

A slightly modified form of the present invention is shown in Fig. 4, wherein the edges of the tray 7' rest upon inwardly directed shoulders 16 formed in the upstanding edge wall 4' of the body 2'. The bottom of the downwardly directed edge wall 6' of the top closure member 5' also is adapted to snap fit over outwardly directed fastening lip at the upper top of upwardly directed edge wall 4' and form a sealing engagement therewith. In other respects, the modified form of the invention shown in Fig. 4 is quite similar to that as shown at Figs. 1, 2 and 3 and corresponding primed reference numerals indicate corresponding parts.

Numerous modifications and variations of the present invention will occur to those skilled in the art and are intended to be included and comprehended herein. For example, we find it desirable in certain instances to dispense with the tray entirely and to provide our invention in a form suitable for carrying a single cut of cake or pie. Also, the means for fastening the closure member and the body member may be modified or dispensed with entirely, if desired. In addition, the hinged means may be dispensed with and other suitable means employed in lieu thereof or the closure member may be removable along the entire edge wall and may be adapted to cooperate with the edge wall of the body member in various ways for fastening same. For example, they might resiliently engage or frictionally engage one another. Also, the edge walls of the top closure member may fit within the edge walls of the body member, if desired, or the edge walls of the closure member may fit on the outside of the edge walls of the body member, if desired. Also, a sealing lip, either inwardly or outwardly directed, may be provided, and it may be desirable under some circumstances to introduce suitable gasketing material for effecting a good seal.

The closure member need not be provided with a downwardly directed edge wall as illustrated but may be a flat top closure member merely closing the top of the upwardly directed edge wall of the body member or the top closure member may be provided with a relatively long, downwardly directed edge wall, and the body member may be merely a flat bottom adapted to effectively engage the downwardly directed edge wall of the top closure member.

The handle means carried by the tray may be modified within wide limits or dispensed with entirely if desired, as may the knife, fork and spoon-retaining strap illustrated.

It should also be noted that the invention is primarily, though not necessarily, intended to be molded of plastic, pressed metal or various other suitable material, and the configuration thereof may vary considerably from that illustrated herein. For example, the various corners of the container will have suitable radii determined by molding practice and thus will depart somewhat from true sector plan form, and all such variations are intended to be included herein.

The examples described and illustrated herein are exemplary only and are not intended to limit the scope of the present invention, which is to be interpreted in the light of the prior art and the appended claim only.

We claim:

A hollow food container adapted for use within a lunch-box and arranged to sealably carry and protect from crushing virtually sector-shaped cuts of cake and pie, comprising: a pair of relatively rigid hollow body members, each virtually sector-shaped in plan view and each provided with a bottom wall and a continuous connected upstanding side walls integral with the bottom; means hingedly connecting the marginal edge of one wall with the marginal edge of a wall of the other body member whereby said body members are in adjacent relation when the container is open and the edges of said upstanding walls are in abutting relation when the container is closed; a removable tray including a platform, a lifting lip and feet positioned in one of the body members, said feet resting on the bottom wall of said body member to support the platform, said lip extending upwardly into proximity with the bottom wall of the other body member when the container is in closed position to prevent the tray from shifting; and releasable latch means adapted to hold the container in closed position with edges of the walls in abutting relation.

EDRA MAE BROOKS.
    VICTORIA A. JEFFRIES.

REFERENCES CITED

The following references are of record in the file of this patent:

UNITED STATES PATENTS

| Number | Name | Date |
| --- | --- | --- |
| 692,109 | Boniface | Jan. 28, 1902 |
| 1,257,057 | White | Feb. 19, 1918 |
| 1,546,254 | Rotzell | July 14, 1925 |
| 1,597,566 | Bailey | Aug. 24, 1926 |
| 2,388,442 | Reyburn | Nov. 6, 1945 |

FOREIGN PATENTS

| Number | Country | Date |
| --- | --- | --- |
| 429,511 | France | July 20, 1911 |